United States Patent [19]

Wieczorek et al.

[11] Patent Number: 5,703,479

[45] Date of Patent: Dec. 30, 1997

[54] METHOD AND APPARATUS FOR FAULT ISOLATION BY A COMMUNICATION SYSTEM TESTER

[75] Inventors: Alfred B. Wieczorek, Plantation, Fla.; Thomas Mark Jones, Roanoke, Tex.; Michael Kent Sprenger, Mesa, Ariz.

[73] Assignee: Motorola, Inc., Schaumburg, Ill.

[21] Appl. No.: 348,386

[22] Filed: Dec. 2, 1994

[51] Int. Cl.$^6$ .................... G01R 15/00; H03G 5/00
[52] U.S. Cl. ........................... 324/73.1; 455/67.7
[58] Field of Search .......................... 455/67.7, 67.1, 455/67.4; 324/73.1, 537, 158.1

[56] References Cited

U.S. PATENT DOCUMENTS

| | | | |
|---|---|---|---|
| 4,399,556 | 8/1983 | Whidden | 455/67.2 |
| 4,823,391 | 4/1989 | Schwartz | 381/103 |
| 4,903,323 | 2/1990 | Hendershot | 455/67.7 |
| 5,404,572 | 4/1995 | Ishii | 455/67.4 |
| 5,506,910 | 4/1996 | Miller et al. | 381/103 |

*Primary Examiner*—Vinh P. Nguyen
*Assistant Examiner*—Russell M. Kobert
*Attorney, Agent, or Firm*—Frank J. Bogacz

[57] ABSTRACT

A method and apparatus for testing of a unit under test (50) by a communication system tester performs loopback tests. During these loopback tests, data transmitted by the unit under test may be stored (21) and sent back to the unit under test. In addition, user defined prestored data (22) may be transmitted to the unit under test. Further, prestored messages (24) and tones (23) may be stored by the communication system tester and transmitted to the unit under test for display on a speaker. An operator (52) may review the output of the speaker and determine whether the test has been properly passed. As a result, the operator may determine whether a fault exits in the receiver or transmitter of the unit under test.

4 Claims, 3 Drawing Sheets

METHOD AND APPARATUS FOR FAULT ISOLATION BY A COMMUNICATION SYSTEM TESTER

BACKGROUND OF THE INVENTION

The present invention pertains to testing of communications equipment and more particularly to the audio testing of communications equipment utilizing digital modulation formats.

One of the uses of communication systems test equipment is to verify the audio operation, including microphone and speaker and associated circuits, of a unit under test (UUT). A typical test is to input audio signals to a generator included in a test equipment suite, generate a signal containing the input audio for transmission to the UUT via a transfer medium, such as wireline or RF link. This is a test for conventional analog AM and FM communication equipment. No vocoders are used in analog units. The audio input is used as the modulating signal. The audio input modulates the carrier with analog AM or FM modulation and transmits the signal to the unit under test. The UUT demodulates the audio and outputs the audio over its speaker verifying proper operation. The reverse test is performed using the analog demodulation circuits provided by the communication system test equipment suite. For the case of an RF link transfer medium, testing of many types of radios is possible by simply controlling the frequency deviation for FM radios or percent modulation for AM radios.

Current technology addresses this problem by performing audio loopback testing. This testing verifies the operation of input and output audio functions of the unit under test. However, there are problems associated with this testing method. First, the test requires correct operation of the audio input and transmitter functions and the receiver and audio output functions to successfully complete the test. Therefore, failure of the test does not provide information to isolate the problem to audio input or output functions of the UUT. Second, current technology has applied this test method to full duplex communication equipment only. Several types of equipment only support half duplex operation. Therefore the message to be looped back must be stored prior to test equipment transmission to the UUT. This will create the need for a more complicated operator interface.

What is needed is a communication system tester which solves the above problems, without rerquiring the addition of hardware and software to the communication test system.

DESCRIPTION OF THE PREFERRED EMBODIMENT

Figure 1:
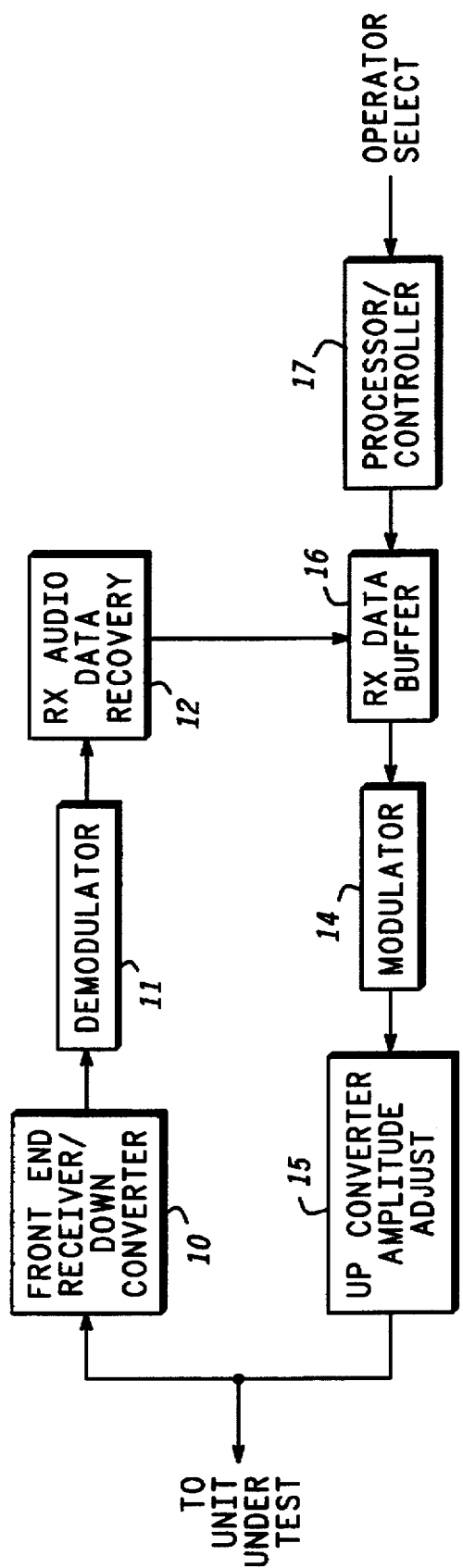
FIG. 1 is a block diagram of a prior art communication system tester.

Current loopback technology is illustrated in FIG. 1. FIG. 1 shows the example for RF transfer medium to the UUT (unit under test, not shown). FIG. 1 illustrates the functions that must be performed by the test equipment suite. Audio is input to the UUT, the UUT digitizes the audio and performs the vocoder function generating encoded audio data. The encoded audio is input to the generated RF waveform and transmitted to the test equipment suite.

The receiver 10 performs frequency conversion to the demodulator 11 IF frequency. The demodulator 11 demodulates the received IF signal and transfers the received data to the RX audio data recovery function 12 which extracts the encoded audio data. The encoded audio is stored in a RX data buffer 16. Upon operator initiation to the test system processor/controller 17 or after a program delay, encoded audio is transferred from the RX data buffer 16 to the modulator 14. The modulator 14 generates a transmit IF signal which is input to the up converter 15. The up converter 15 performs frequency conversion and amplitude adjustment prior to coupling the signal to the transfer medium.

The UUT receives the RF signal, performs demodulation and vocoder functions, and outputs the audio to the UUT speaker. This test verifies operation of transmit and receive audio functions, but does not support fault isolation to transmit or receive audio functions.

Figure 2:
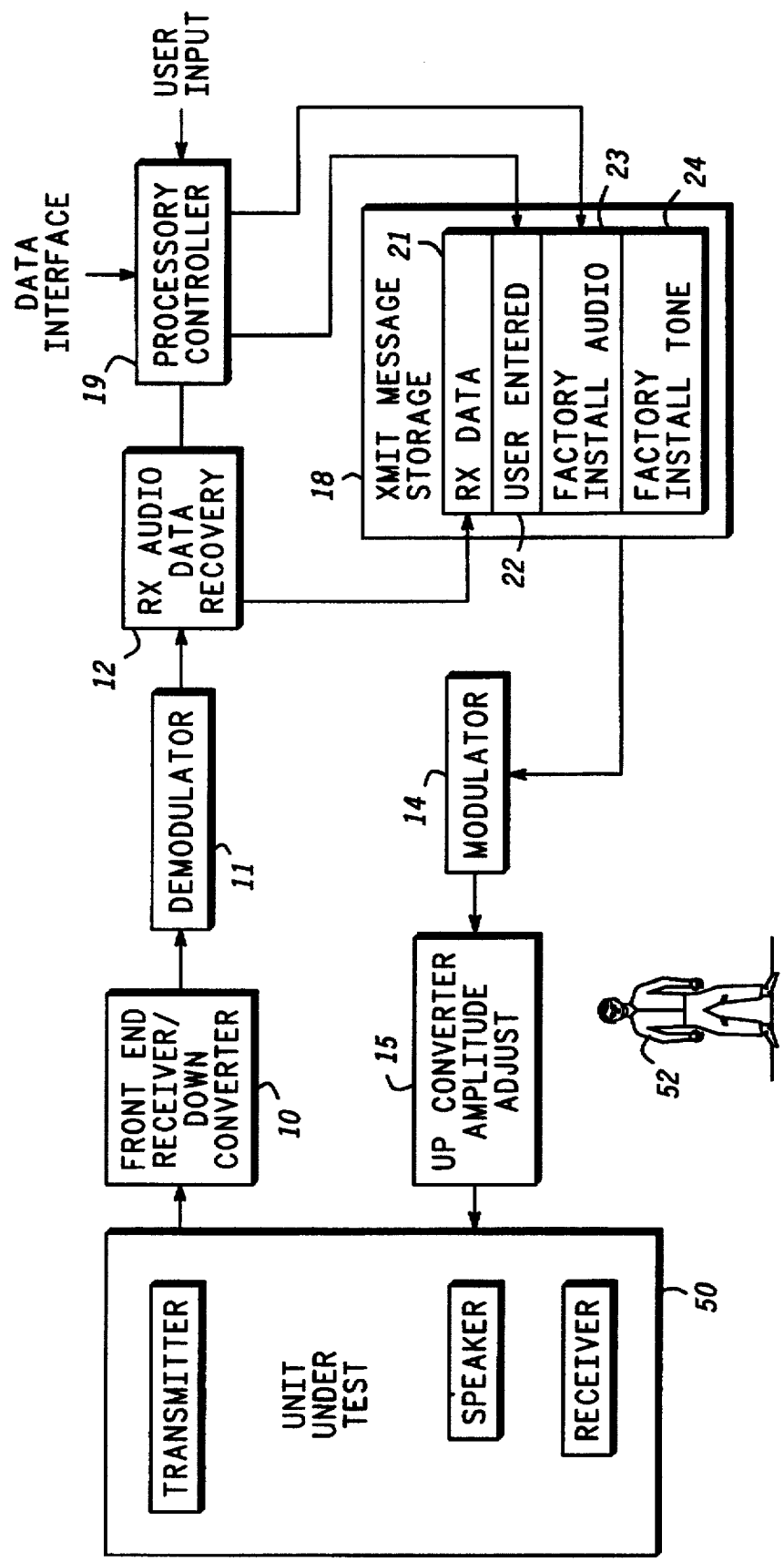
FIG. 2 is a block diagram of a data buffer arrangement of a communication system tester in accordance with the present invention.

The present invention is an enhancement to the loopback test is shown in FIG. 2. Functions are as described for FIG. 1 with the exception that the RX data buffer (16) is replaced by the XMIT Message Storage (18). The XMIT Message Storage (18) function provides the capability to store multiple encoded audio data messages for transmission to the UUT. Encoded audio data messages can be stored from several sources:

1) Factory installed messages permanently stored in non-volatile memory. Examples are test tones (buffer 24) or audio messages (buffer 23) designed to illuminate deficiencies in speaker performance. Factory installed messages and tones allow users who do not have the capability to generate vocoded audio data to perform audio tests of the communication equipment (UUT).

2) User entered messages input to the test equipment through a data interface such as an RS-232 port. This message is stored in programmable memory (buffer 22) to support user modification. The capability of user entered messages allows users with vocoder generated audio data to customize testing of the communication subscriber unit to verify equipment performance to the UUT's design requirements.

3) Received encoded audio data recovered from transmissions from the UUT (buffer 21). This message is also stored in programmable memory to support modification on a per test basis. This type of stored message allows audio loopback testing for verifying operation of the UUT audio input function.

Items 1) and 2) above are used to verify unit receiver operation.

Testing of the UUT receive audio functions is verified by operator selection via the user input lead coupled to processor/controller 19 for one of the stored encoded audio data buffers 21, 22 23 or 24. The operator selects factory installed message from factory installed audio section 23 of the XMIT Message Storage 180 The encoded audio data is input to the modulator 14 to generate a transmit IF signal. The transmit IF signal is input to the up converter 15 which up converts the signal and performs amplitude adjustment prior to coupling the signal into the transfer medium.

The UUT receives the RF signal, performs demodulation and vocoder functions, and outputs the audio to the UUT speaker. This test verifies operation of the UUT receive audio functions. The architecture supports the loopback test as previously described to verify operation of the UUT audio input and transmitter functions. A flowchart illustrating the test process is shown in FIG. 3 which will be explained infra.

Figure 3:
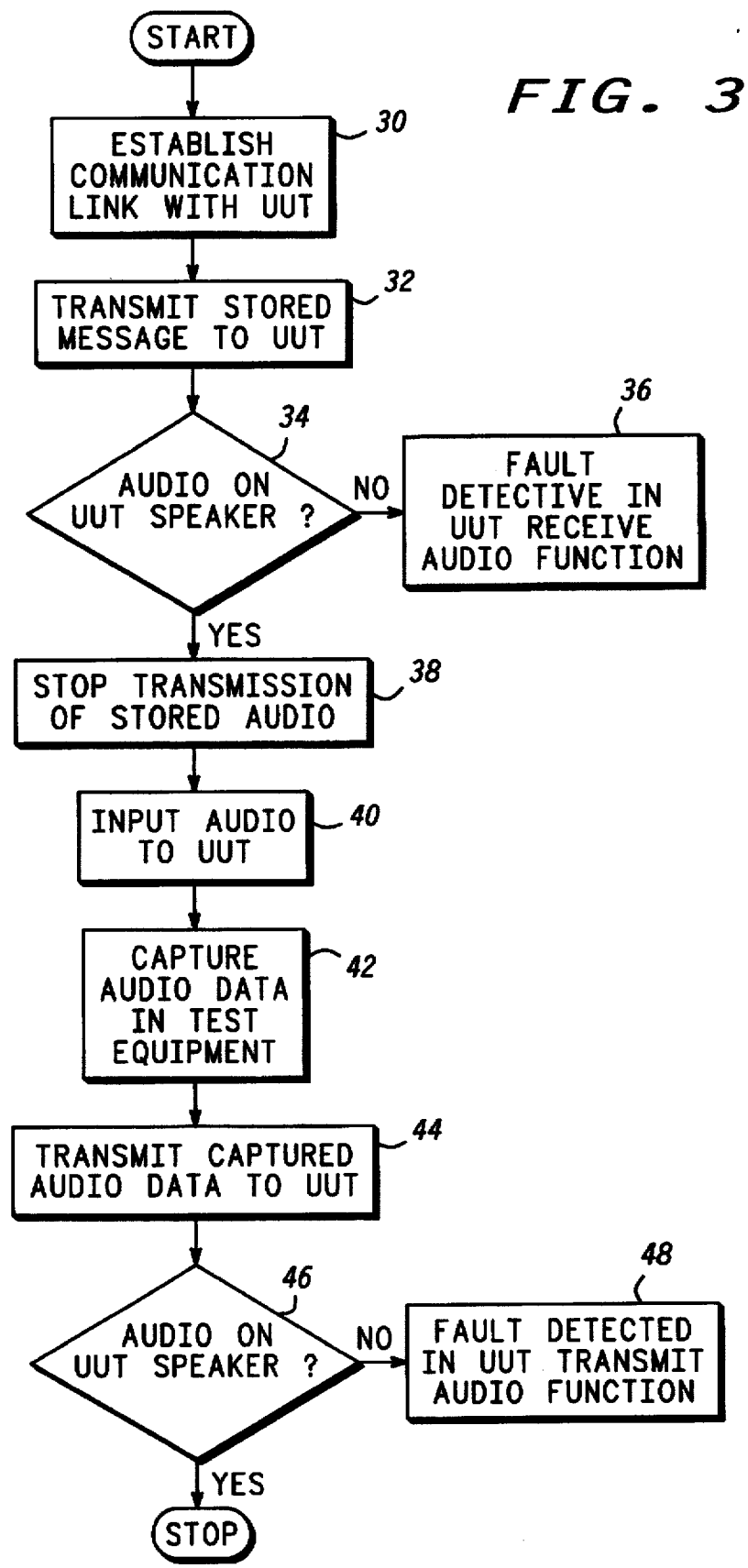
FIG. 3 is a flow chart of a communication system tester audio loopback method in accordance with the present invention.

FIG. 3 is a flow chart of the processor/controller 19 processing for the first arrangement explained above in FIG. 2. The process is started and block 30 is entered. Block 30 establishes a communication link with the unit under test. This communication link may be any communication link preferrably either a wireline connection or a RF link. Next, under control of the processor/controller 19 a stored message is transmitted from the XMIT message storage 18, a factory installed audio message for example, through modulator 14 and up converter 15 to the UUT, block 32.

The UUT receives the RF signal, demodulates the data, performs the voice synthesis function and outputs the audio through its speaker. Then the user listens to the speaker of the UUT and determines whether the expected audio was produced, block 34. If the proper audio output is not detected on the UUT speaker, then block 34 transfer control to block 36 via the no path which determines that a fault was detected in the UUT receive audio function. If the proper audio output was detected on the UUT speaker, then block 34 transfers control to block 38 via the yes path. Block 38 stops transmission of the stored audio message of transmit message storage buffer 18.

Next, user entered audio is input to the UUT, block 40. The audio data sent to the UUT is sent back to the communication system tester and the audio data is captured and stored in XMIT message storage 18 in RX data buffer 21, block 42. Then the captured data in RX data buffer 21, by operator initiation or a program delay, is transmitted to the UUT, block 44. Block 46 determines whether the proper audio output is detected on the speaker of the UUT. If the proper audio is not output on the speaker of the UUT, block 46 transfers control to block 48 via the no path. Block 48 determines that a fault was detected in the transmit audio portion of the UUT. If the proper audio was output on the UUT's speaker, then block 46 transfers control via the yes path and the process is ended, The invention shown in FIG. 2 and process shown in FIG. 3 improves diagnostic capability by providing fault isolation to UUT receive audio or transmit audio functions This doubles the diagnostic information available to the user versus prior art. The invention does not require the inclusion of the specialized vocoder hardware and software to the communication systems test suite.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A method for testing a unit under test, said method performed by a communication system tester coupled to said unit under test, said method comprising the steps of:

transmitting by said communication system tester a stored message to said unit under test;

determining by an operator whether said stored message is output on a speaker of the unit under test;

inputting by the communication system tester an audio signal selected by the operator to the unit under test, if the operator verified that said stored message was output on the speaker of said unit under test;

sending back by said unit under test a processed audio signal to the communication system tester, said processed audio signal being derived from the audio signal;

capturing by the communication system tester the processed audio signal;

transmitting the captured, processed audio signal to the unit under test; and determining by said operator whether the captured, processed audio signal was properly produced on a speaker of the unit under test.

2. A method for testing a unit under test as claimed in claim 1, wherein there is further included the steps of:

detecting a fault in a transmitter of the unit under test if the stored message was not produced on the speaker of the unit under test; and ending the method for testing a unit under test, if the stored message was not produced on the speaker of the unit under test.

3. A method for testing a unit under test as claimed in claim 1, wherein there is further included the steps of:

detecting a fault in a receiver of said unit under test, if said the captured, processed audio signal is not produced on the speaker of the unit under test; and stopping by the communication system tester the transmission of the stored message to the unit under test, if the captured, processed audio signal is produced on the speaker of the unit under test.

4. A method for testing a unit under test as claimed in claim 1, wherein there is further included the step of establishing a communication link between the unit under test and the communication system tester.

* * * * *